United States Patent
Sasaoka et al.

(10) Patent No.: US 9,786,946 B2
(45) Date of Patent: Oct. 10, 2017

(54) SOLID-STATE BATTERY AND METHOD FOR PRODUCING THE SAME, AND ASSEMBLED BATTERY AND METHOD FOR PRODUCING THE SAME

(71) Applicant: TOYOTA JIDOSHA KABUSHIKI KAISHA, Toyota-shi, Aichi-ken (JP)

(72) Inventors: Tomoharu Sasaoka, Hadano (JP); Norihiro Ose, Sunto-gun (JP); Hajime Hasegawa, Susono (JP); Kazuhito Kato, Sunto-gun (JP); Kengo Haga, Susono (JP); Daichi Kosaka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 247 days.

(21) Appl. No.: 14/661,541

(22) Filed: Mar. 18, 2015

(65) Prior Publication Data
US 2015/0270585 A1    Sep. 24, 2015

(30) Foreign Application Priority Data
Mar. 18, 2014   (JP) .................................. 2014-055299

(51) Int. Cl.
*H01M 10/04*  (2006.01)
*H01M 2/10*  (2006.01)
*H01M 10/052*  (2010.01)
*H01M 10/0562*  (2010.01)
*H01M 10/0585*  (2010.01)

(52) U.S. Cl.
CPC ..... *H01M 10/0413* (2013.01); *H01M 2/1077* (2013.01); *H01M 10/0468* (2013.01); *H01M 10/052* (2013.01); *H01M 10/0562* (2013.01); *H01M 10/0585* (2013.01); *H01M 2220/20* (2013.01); *H01M 2300/0065* (2013.01); *Y02E 60/122* (2013.01); *Y02P 70/54* (2015.11); *Y10T 29/49108* (2015.01)

(58) Field of Classification Search
None
See application file for complete search history.

(56) References Cited

U.S. PATENT DOCUMENTS

2010/0099023 A1* 4/2010 Kuroda ............... H01M 2/0245
429/159
2012/0216394 A1   8/2012 Kitaura et al.
2012/0321935 A1  12/2012 Kim et al.

FOREIGN PATENT DOCUMENTS

CN    102598391 A    7/2012
CN    102832357 A   12/2012
(Continued)

*Primary Examiner* — Wyatt McConnell
(74) *Attorney, Agent, or Firm* — Oliff PLC

(57) ABSTRACT

A solid-state battery comprising a stack including at least one unit cell including a positive electrode layer including a positive electrode active material, a negative electrode layer including a negative electrode active material, and a solid electrolyte layer laminated between the positive and negative electrode layers, and an outer covering accommodating the stack, wherein the solid-state battery further including a pressure receiving member provided on at least a part of a periphery of the outer covering, and wherein the pressure receiving member has a thickness of less than a total thickness of the stack and the outer covering in a stacking direction of the unit cell.

19 Claims, 8 Drawing Sheets

(56) References Cited

FOREIGN PATENT DOCUMENTS

| | | |
|---|---|---|
| JP | 2012-142228 A | 7/2012 |
| JP | 2012-222981 A | 11/2012 |
| JP | 2013-045556 A | 3/2013 |

* cited by examiner

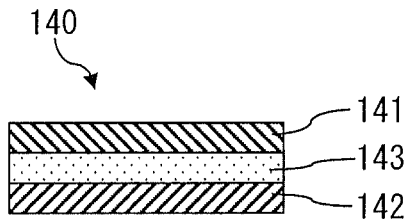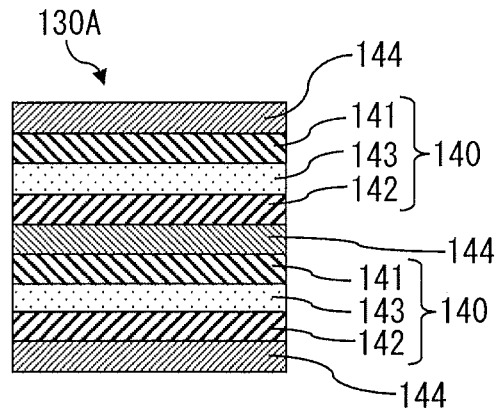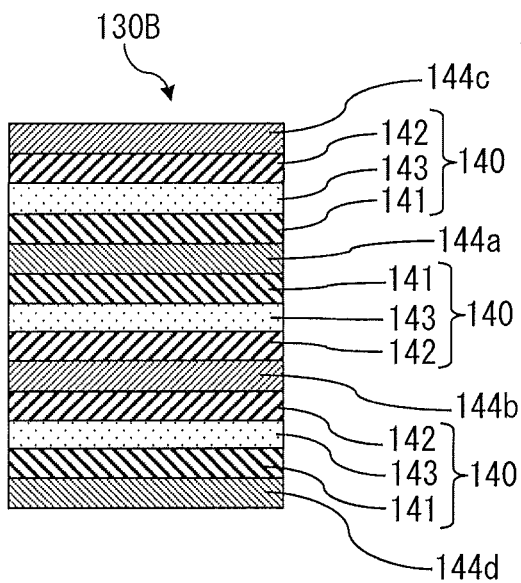

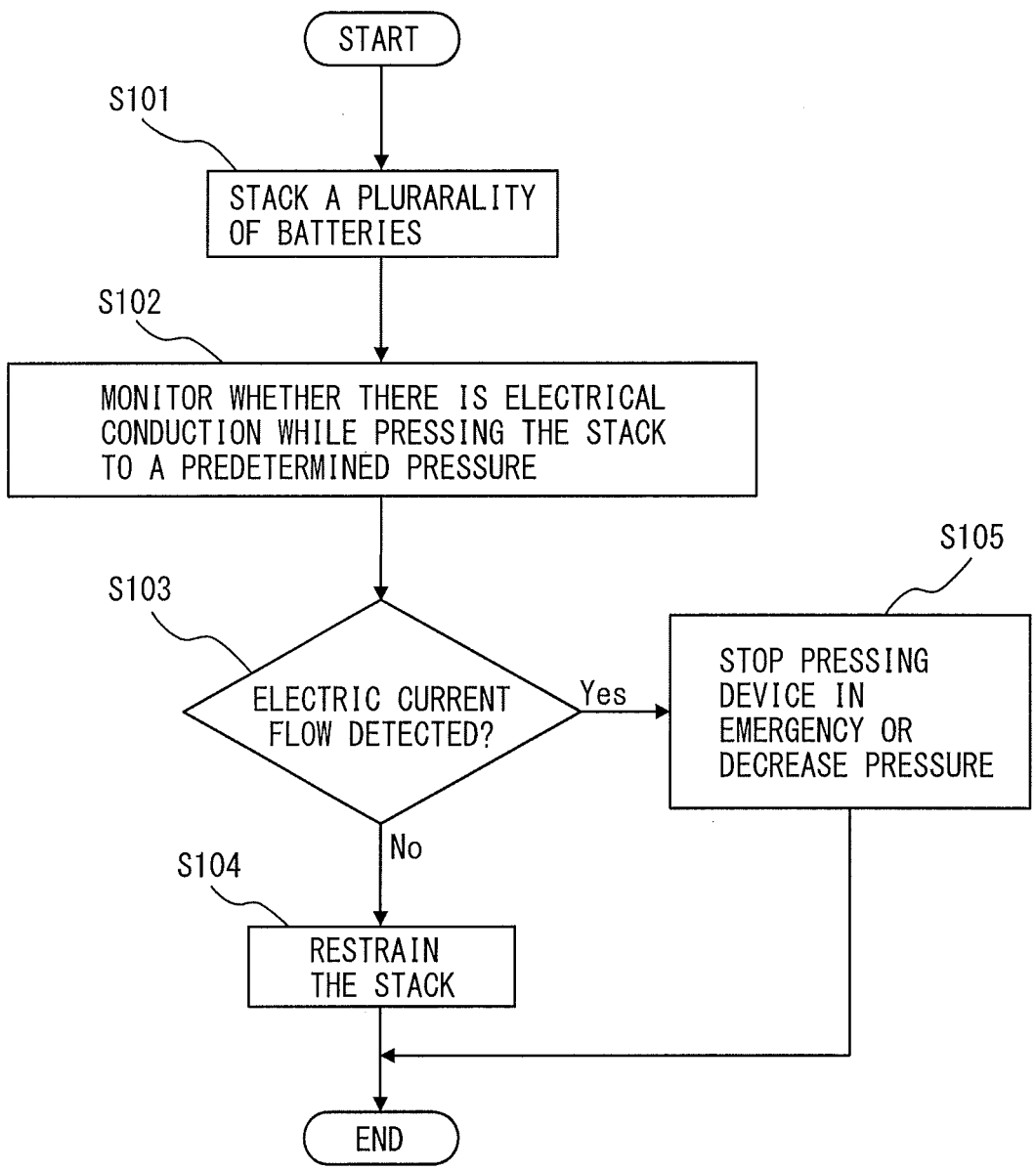

SOLID-STATE BATTERY AND METHOD FOR PRODUCING THE SAME, AND ASSEMBLED BATTERY AND METHOD FOR PRODUCING THE SAME

TECHNICAL FIELD

The present invention relates to a solid-state battery and a method for producing the same as well as an assembled battery comprising a plurality of the solid-state batteries and a method for producing the same.

BACKGROUND ART

It is considered that a solid-state battery in which an electrolyte is comprised of a solid electrolyte is capable of simplifying a safety device and is excellent in production cost and productivity, since it does not use a flammable organic solvent in the battery. In particular, in recent years, with the increase in demand for a hybrid vehicle, electric vehicle, etc., there is a need to improve the capacity and output as well as safety of solid-state batteries. Patent Literature 1 suggests a method for producing a solid-state battery comprising a step of preparing a stack by stacking in order of a positive electrode current collector, a positive electrode layer, an electrolyte layer, a negative electrode layer, and a negative electrode current collector, and subsequently restraining the stack while pressing the stack in the stacking direction, in order to prevent the delamination between the current collectors and the positive or negative electrode layer. In addition, Patent Literature 2 suggests adjusting the pressure applied to a power generation element (unit cell) comprising a positive electrode, a negative electrode, and an electrolyte disposed between the positive and negative electrodes, by the fluid filled within a sealed vessel accommodating the power generation element. Moreover, Patent Literature 3 suggests a vehicle driving unit comprising a drive control means for controlling the discharge current of a battery by adjusting the pressure applied to the battery with a pressure adjusting unit depending on the vehicle driving state.

As described above, it has been suggested to press a stack of a positive electrode layer, an electrolyte layer and a negative electrode layer during the production or use (during vehicle driving) of a battery. However, during the production of an assembled battery in which a plurality of the solid-state batteries comprising such a cell are stacked or during use of such solid-state batteries or assembled battery, there is a possibility of a malfunction such as destruction, excessive output, etc., of the battery, if the stack or solid-state batteries is or are pressed excessively due to the failure of the control system of the production apparatus or pressure control device.

CITATIONS LIST

Patent Literatures

Patent Literature 1: Japanese Unexamined Patent Publication No. 2012-142228 A
Patent Literature 2: Japanese Unexamined Patent Publication No. 2013-45556 A
Patent Literature 3: Japanese Unexamined Patent Publication No. 2012-222981 A

SUMMARY OF INVENTION

Technical Problem

The present invention has been made in view of the above problems, and is directed to provide a solid-state battery which is prevented from occurring a malfunction such as destruction, excessive output, etc., of the battery by preventing the stack of a positive electrode layer, an electrolyte layer and a negative electrode layer from being pressed excessively during the production or use of the battery, and which has excellent performance characteristics such as reliability, durability, etc., in addition to improved capacity and output density, and a method for producing the same.

The present invention is directed to provide an assembled battery comprising a plurality of the solid-state batteries and a method for producing the same.

Solution to Problem

That is, the present invention provides, in one embodiment, a solid-state battery comprising a stack comprising at least one unit cell comprising a positive electrode layer comprising a positive electrode active material, a negative electrode layer comprising a negative electrode active material, and a solid electrolyte layer laminated between the positive and negative electrode layers; and an outer covering accommodating the stack, wherein the solid-state battery further comprising a pressure receiving member provided on at least a part of the periphery of the outer covering, and wherein the pressure receiving member has a thickness of less than a total thickness of the stack and the outer covering in a stacking direction of the unit cell.

The present invention provides, in another embodiment, a method for producing the solid-state battery, comprising steps of:

(a) forming a stack comprising at least one unit cell comprising a positive electrode layer comprising a positive electrode active material, a negative electrode layer comprising a negative electrode active material, and a solid electrolyte layer laminated between the positive and negative electrode layers;

(b) accommodating the stack in an outer covering; and (c) forming a pressure receiving member at least a part of the periphery of the outer covering, wherein the pressure receiving member has a thickness of less than a total thickness of the stack and the outer covering in a stacking direction of the unit cell.

The present invention provides, in another embodiment, an assembled battery comprising a plurality of the solid-state batteries as described above, wherein the solid-state batteries are stacked in the same direction as the stacking direction of the stack.

The present invention provides, in another embodiment, a method for producing an assembled battery comprising a plurality of the solid-state batteries, comprising steps of:

(i) providing a plurality of the solid-state batteries comprising a stack comprising at least one unit cell comprising a positive electrode layer comprising a positive electrode active material, a negative electrode layer comprising a negative electrode active material, and a solid electrolyte layer laminated between the positive and negative electrode layers; and an outer covering accommodating the stack, wherein the solid-state battery further comprising a pressure receiving member provided on at least a part of s periphery of the outer covering, and wherein the pressure receiving member has a thickness of less than a total thickness of the stack and the outer covering in the stacking direction of the unit cell;

(ii) stacking the plurality of the solid-state batteries so that the pressure receiving members of the plurality of the solid-state batteries are arranged in series and spaced apart from each other along the stacking direction, wherein the stacking direction of the positive electrode layer, solid electrolyte layer and negative electrode layer of each of the plurality of the solid-state batteries is the same as the stacking direction of the plurality of the solid-state batteries; and (iii) pressing the plurality of the solid-state batteries in the stacking direction.

The present invention provides, in still another embodiment, a power storage device comprising:

an assembled battery as described above, a pressing device for pressing the assembled battery in the stacking direction of the plurality of solid-state batteries of the assembled battery, and an electrical conduction detecting device for detecting contact between the plurality of the pressure receiving members of the plurality of the solid-state batteries in response to the compression of the plurality of the solid-state batteries of the assembled battery in the stacking direction due to the pressing of the plurality of the solid-state batteries by electrical conduction through the plurality of the pressure receiving members in the stacking direction.

BRIEF DESCRIPTION OF THE DRAWINGS

FIGS. 3A and 3B are respectively a schematic cross-sectional view of an example of the unit cells of the solid-state battery of the present invention. FIG. 3C is a cross-sectional view schematically showing another example of the stack in the solid-state battery according to the present invention.

FIG. 7 is a flowchart illustrating the flow of the production of an assembled battery according to the present invention.

DESCRIPTION OF EMBODIMENTS

Figure 1A:
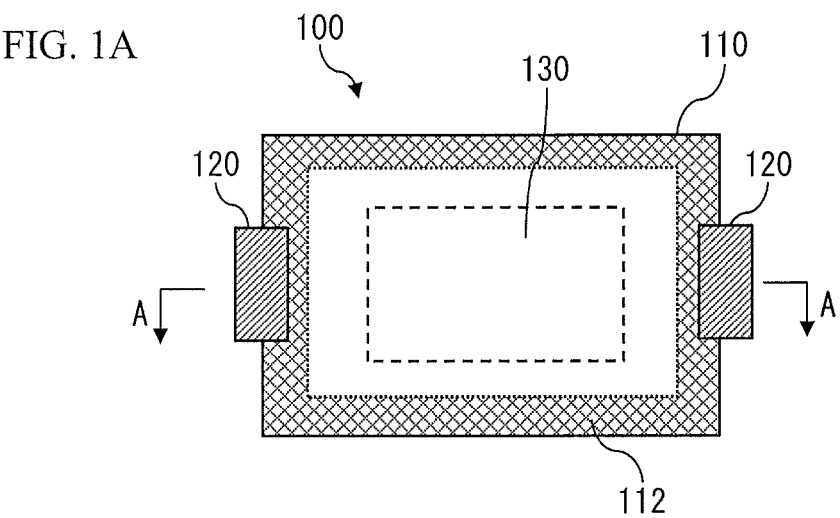
FIGS. 1A and 1B are respectively a schematic plan view and a schematic cross-sectional view of one embodiment of the solid-state battery of the present invention.

Embodiments of the present invention will be described below with referring to the drawings. In the drawings referred to below, the same reference numbers are given to the same or corresponding elements.

[Solid-State Battery]

As described above, the solid-state battery of the present invention comprises a stack comprising at least one unit cell comprising a positive electrode layer, a negative electrode layer, and a solid electrolyte layer laminated between the positive and negative electrode layers, characterized in that the solid-state battery further comprises a pressure receiving member for preventing an excessive pressure from being applied to the stack in the stacking direction of the unit cells.

Figure 1B:
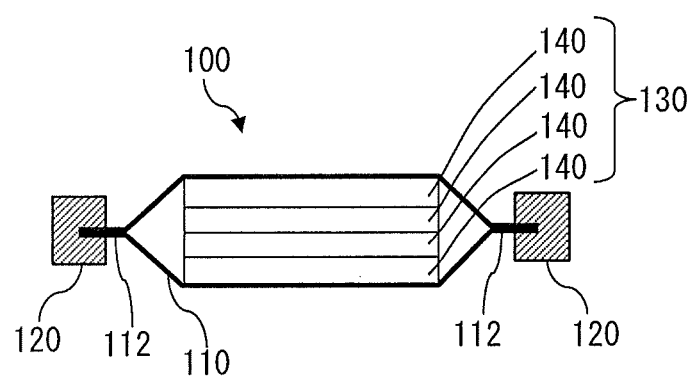

FIG. 1A is a schematic front view of one embodiment of the solid-state battery according to the present invention. In the embodiment shown in FIG. 1A, solid-state battery 100 comprises outer covering 110 accommodating stack 130 comprising at least one unit cell, and a pair of pressure receiving members 120, wherein the pair of pressure receiving members 120 are respectively provided on at least a part of periphery 112 of the outer covering. In FIG. 1A shaded region 112 indicates the sealed region of the periphery of outer covering 110, and the position of stack 130 within outer covering 110 is indicated with a dashed line. FIG. 1B is a cross-sectional view taken along the line A-A in FIG. 1A. In FIG. 1B, a part of sealed region 112 of the periphery of the outer covering is schematically shown in a state in the part of the sealed region is held with pressure receiving member 120. In addition, in FIG. 1B, unit cells 140 that form stack 130 are schematically shown in a stacked state. Unit cells 140 are stacked with each other via current collectors (not shown), as will be described for FIGS. 3B and 3C.

Figure 2A:
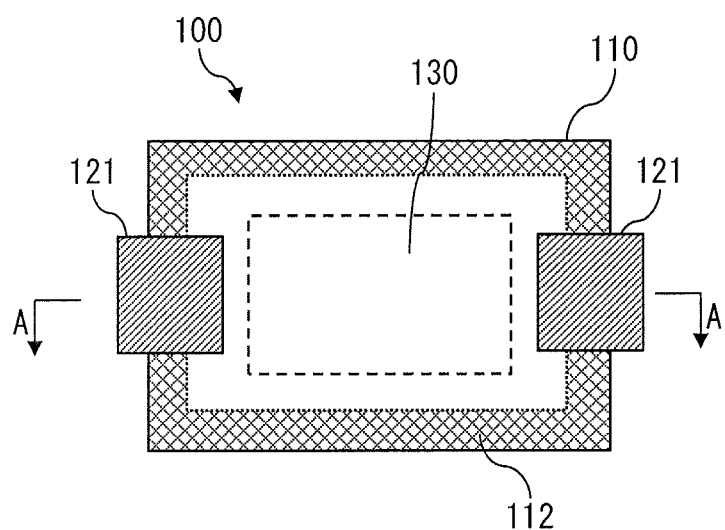
FIGS. 2A and 2B are respectively a schematic plan view and a schematic cross-sectional view of another embodiment of a solid-state battery of the present invention.
Figure 2B:
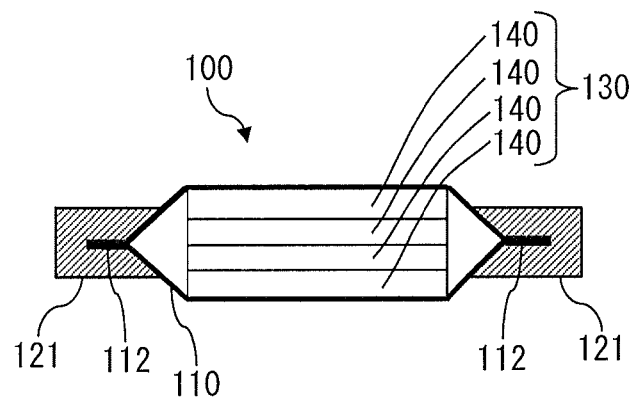

FIG. 2A is a schematic front view of another embodiment of a solid-state battery according to the present invention. In the embodiment shown in FIG. 2A, similarly to the embodiment shown in FIG. 1A, solid-state battery 100 comprises outer covering 110 accommodating stack 130 comprising at least one unit cell, and a pair of pressure receiving members 121, wherein the pair of pressure-receiving members 121 are respectively provided on at least a part of periphery 112 of the outer covering. In FIG. 2A shaded region 112 indicates the sealed area of the periphery of outer covering 110, and the position of stack 130 within outer covering 110 is indicated with a dashed line. FIG. 2B is a cross-sectional view taken along the line A-A in FIG. 2A In FIG. 2B, a part of sealed region 112 of the periphery of outer covering 110 is schematically shown in a state in which the part of the sealed region is held with pressure receiving member 121. Similarly to the embodiment shown in FIG. 1B, unit cells 140 of stack 130 are schematically shown in a stacked state. Unit cells 140 are stacked with each other via current collectors (not shown), as will be described for FIGS. 3B and 3C. In the embodiment schematically shown in FIGS. 2A and 2B, pressure receiving members 121 respectively extend to a position on the external surface of outer covering, between sealed region 112 and stack 130, as compared to the embodiment shown in FIGS. 1A and 1B.

By holding at least a part of periphery 112 of outer covering 110 with pressure receiving member (120, 121) as described above, pressure receiving member (120, 121) can be firmly fixed to periphery 112 of outer covering 110. The pressure receiving member can be formed integrally with the periphery of the outer covering by, for example, a molding process comprising filling a mold with a thermoplastic or thermosetting material along with at least a part of the periphery of the outer coveting. Alternatively, for example, a preformed pressure receiving member may be adhered to one or both sides of at least a part of periphery 112 of outer covering 110 with an adhesive (for example, a pressure-sensitive adhesive, a thermosetting adhesive, a hot-melt adhesive, etc.).

Although pressure receiving members are respectively provided on two areas located on opposite sides of periphery 112 of outer covering 110 in the embodiments shown in FIGS. 1A and 1B and FIGS. 2A and 2B, the number and size of the pressure receiving members as well as the position at which the pressure receiving member is provided, are not particularly limited, as long as the pressure receiving members can receive an excessive pressure applied to stack 130 comprising at least one unit cell 140 in the stacking direction. For example, the pressure receiving member may be provided on periphery 112 of outer covering 110 so as to surround stack 130. Further, each corner of outer covering 110 may be provided with a pressure receiving member, for example. If a plurality of the pressure receiving members are provided, the number and positions of the pressure receiving members can be appropriately adjusted so that a pressure is applied to each of the provided pressure receiving members as uniform as possible.

FIG. 3A is a cross-sectional view schematically showing an example of a unit cell in the solid-state battery according to the present invention. Unit cell 140 shown in FIG. 3A comprises positive electrode layer 141, negative electrode layer 142, and solid electrolyte layer 143 laminated between positive electrode layer 141 and negative electrode layer 142. The stack accommodated in an outer covering may have a positive electrode current collector and a negative electrode current collector respectively provided on the upper surface of positive electrode layer 141 and the lower surface of negative electrode layer 142 of one unit cell. Alternatively, as shown in FIG. 3B with reference numeral 130A, the stack accommodated in the outer covering may be one comprising a plurality of unit cells stacked with each other via current collectors 144 and further comprising current collectors 144 provided respectively on the upper surface of the top unit cell and the lower surface of the bottom unit cell.

FIG. 3C is a cross-sectional view schematically showing another example of the stack in the solid-state battery according to the present invention. Stack 130B shown in FIG. 3C has positive electrode layers 141 on both sides of positive electrode current collector 144a, and negative electrode layers 142 on both sides of negative electrode current collector 144b, and solid electrolyte layer 143 which exists between positive electrode layer 141 formed on one side of positive electrode current collector 144a and negative electrode layer 142 formed on one side of negative electrode current collector 144b. A positive electrode layer, a solid electrolyte layer and a negative electrode layer adjacent to each other form a unit cell. The outermost negative electrode current collector 144c is provided with negative electrode layer 142 only on one side thereof, and the outermost positive electrode current collector 144d is provided with positive electrode layer 141 only on one side thereof. In FIGS. 3A, 3B and 3C a positive electrode current collector tab and a negative electrode current collector tab are omitted for simplicity and clarity of the drawings. The number of unit cells and the current collectors that form the stack in the solid-state battery according to the present invention are not limited to the embodiments shown in FIGS. 3B and 3C.

The positive and negative electrode layers respectively comprise at least one electrode active material. In the positive and negative electrode layers, the electrode active material includes, for example, those that can be used in lithium ion batteries. Electrode active materials that can be used in lithium ion batteries include, for example, but are not limited to, lithium cobaltate ($LiCoO_2$); lithium nickelate ($LiNiO_2$); $Li_{1+x}Ni_{1/3}Nn_{1/3}Co_{1/3}O_2$ ($0 \leq x \leq 1$); lithium manganate ($LiMn_2O_4$); heteroelement-substituted Li—Mn spinel having a composition represented by $Li_{1+x}Mn_{2-x-y}M_yO_4$ (M is at least one selected from Al, Mg, Co, Fe, Ni and Zn, $0 \leq x \leq 0.06$, $0.03 \leq y \leq 0.15$); lithium titanate ($Li_xTiO_y$, $0.36 \leq x \leq 2$, $1.8 \leq y \leq 3$); phosphoric acid metal lithium ($LiMPO_4$, wherein M is at least one selected from Fe, Mn, Co and Ni); transition metal oxides such as vanadium oxide ($V_2O_5$), molybdenum oxide ($MoO_3$), etc.; titanium sulfide ($TiS_2$); carbon materials (C) such as graphite, hard carbon, etc.; lithium cobalt nitride (LiCoN); lithium silicon oxide ($Li_xSi_yO_z$, wherein $x+4y-2z=0$); lithium metal (Li); lithium alloys (LiM; wherein M is one or more selected from Sn, Si, Al, Ge, Sb, P, etc.); lithium storage intermetallic compound ($Mg_xM$; wherein M is at least one selected from Sn, Ge and Sb, or $N_ySb$; N is at least one selected from In, Cu and Mn); and derivatives thereof. There is no clear distinction between the positive electrode active material and negative electrode active material, and a battery having any voltage can be configured by comparing the charge-discharge potential of two compounds and combining a positive electrode active material having a higher potential and a negative electrode active material having a lower potential.

The positive electrode layer and negative electrode layer may comprise, in addition to the electrode active materials, a solid electrolyte, an electrically conductive material, a binder, etc., to impart the positive and negative electrode layers with ion conductivity, electrical conductivity, flexibility, etc. Examples of the binder which may be contained in the positive and negative electrode layers include fluorine-containing resins such as polyvinylidene fluoride (PVDF), etc.

The solid electrolyte contained in the positive and negative electrode layers, may be those capable of imparting the positive and negative electrode layers with ionic conductivity, and are not particularly limited. The solid electrolyte which can be used in the positive and negative electrode layers includes those illustrated below as a solid electrolyte which forms the solid electrolyte layer. For example, the solid electrolyte contained in the positive electrode layer includes a sulfide-based solid electrolyte prepared by mixing $Li_2S$ and $P_2S_5$ at a weight ratio of $Li_2S:P_2S_5=50:50$ to $100:0$ (for example, $Li_2S:P_2S_5=70:30$). The same solid electrolyte as that contained in the positive electrode layer can be used as the solid electrolyte contained in the negative electrode layer.

The electrically conductive material contained in the positive and negative electrode layers is not particularly limited as long as it is capable of imparting the positive and negative electrode layers with electrical conductive properties, and includes, for example, those that can be used in lithium ion battery. Examples of the electrically conductive material include electrically conductive carbon materials such as acetylene black, Ketjen black, VGCF (vapor grown carbon fibers), carbon nanotubes, etc.

The ratio of each component of the positive and negative electrode layers is not particularly limited. The thicknesses of the positive and negative electrode layers are not particularly limited, but generally are preferably in the range of from 0.1 to 1000 μm.

The solid electrolyte layer at least comprises a solid electrolyte. The solid electrolyte used in the solid electrolyte layer is not particularly limited as long as it is a known solid electrolyte which can be used in a battery, and the same material as the solid electrolyte which can be used in the positive and negative electrode layers can be used. The solid electrolyte may be an inorganic solid electrolyte, an organic solid electrolyte, and combination of two or more of them. Examples of the solid electrolyte include those that can be used in lithium-ion battery. Examples of the solid electrolytes for lithium ion battery include, but are not limited to, oxide-based amorphous solid electrolytes such as $Li_2O$—$B_2O_3$—$P_2O_5$, $Li_2O$—$SiO_2$, $Li_2O$—$B_2O_3$, $Li_2O$—$B_2O_3$—ZnO, etc.; sulfide-based amorphous solid electrolytes such as $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$, $Li_2S$—$P_2S_5$, etc.; crystalline oxides and oxynitrides such as $LiI$, $LiI$—$Al_2O_3$, $Li_3N$, $Li_3N$—$LiI$—$LiOH$, $Li_{1.3}Al_{0.3}Ti_{0.7}(PO_4)_3$, $Li_{1+x+y}Al_xTi_{2-x}Si_yP_{3-y}O_{12}$ (wherein A is at least one selected from Al and Ga, $0 \leq x \leq 0.4$, $0 \leq y \leq 0.6$), $[(B_{1/2}Li_{1/2})_{1-z}C_z]TiO_3$ (wherein B is at least one selected from La, Pr, Nd and Sm, C is at least one selected from Sr and Ba, $0 \leq z \leq 0.5$), $Li_5La_3Ta_2O_{12}$, $Li_7La_3Zr_2O_{12}$, $Li_6BaLa_2Ta_2O_{12}$, $Li_3PO_{(4-3/2w)}N_w(w<1)$, $Li_{3.6}Si_{0.6}P_{0.4}O_4$, etc.

The solid electrolyte layer preferably contains a binder, in view of flexibility, etc., in the solid electrolyte layer. The binder includes, but is not limited to, fluorocarbon resins such as polyvinylidene fluoride (PVDF), etc.; rubbery resins such as butadiene rubber (BR), styrene-butadiene rubber (SBR), etc. In the solid electrolyte layer, the ratio of each component of the solid electrolyte layer is not particularly limited. The thickness of the solid electrolyte layer is not particularly limited, and may vary depending on the type of the electrolyte, the construction of the battery, etc. The solid electrolyte layer has, for example, a thickness in the range of 0.1 μm to 1000 μm, and preferably has a thickness in the range of 0.1 μm to 300 μm.

Although the materials of the current collectors are not particularly limited as long as they are those commonly known as being capable of functioning as a current collector, examples of the materials of the current collectors include, for example, materials such as aluminum, stainless steel (SUS), iron, copper, etc. The thicknesses of the current collectors may be varied depending on the constituent materials thereof, the intended application, etc., and are not particularly limited. The positive electrode current collector and negative electrode current collector may be respectively connected through a current collecting lead to a positive electrode terminal and a negative electrode terminal.

In the solid-state battery of the present invention, the pressure receiving member is intended to prevent the stack of at least one unit cell from being excessively pressed in the stacking direction of the unit cell. The term "pressing" as used herein means that a pressure is applied to the unit cell(s) or stack so that the stack is compressed in the stacking direction of the unit cells, as compared to the thickness of the unit cell or the stack of at least one unit cell before being pressed. The material, size and shape of the pressure receiving member are not particularly limited, as long as the pressure receiving member can receive the excessive pressure generated unintentionally due to failure in pressing device when pressing the stack at a predetermined pressure, withstand the excessive pressure, and prevent the excessive pressure from being applied to the stack. Examples of the material of the pressure receiving member include thermosetting resins such as phenolic resins, epoxy resins, etc., and thermoplastic resins such as polyolefin resins including polyethylene, polypropylene, etc. As will be described later, in an embodiment in which the pressure receiving member is electrically conductive, the pressure receiving member may comprise a conductive resin, or may contain an electrical conductivity-imparting material such as carbon, metal fillers, etc. The pressure receiving member preferably comprises an electrical conductivity-imparting material such as carbon, metal fillers.

The outer covering may be comprised of any flexible material so that, when a pressure is applied to the outer covering from the outside, the pressure can be transmitted to the stack. Such an outer covering may be appropriately selected from known outer coverings used in conventional batteries. Examples of the outer covering include a heat-sealable laminate film comprising a metal foil, a resin layer (for example, polyethylene terephthalate, nylon, etc.) for imparting the outer covering with impact resistance and reinforcing properties laminated on one side of the metal foil, and a heat-fusible resin layer laminated on the other side of the metal foil. The heat-fusible resin layer may be comprised of a resin such as, but is not limited to, polyethylene, ethylene-vinyl acetate copolymer, ethylene-vinyl alcohol copolymer, polypropylene, etc. Examples of the metal foil include, but are not limited to, stainless steel, Cu, Ni, Al, Fe, etc. The size and shape of the outer covering can be appropriately selected depending on the stack, the intended application of the solid-state battery, etc.

The methods for pressing the stack as described above and for pressing a stack of a plurality of the solid-state batteries as will be described below include, but are not limited to, for example, mechanical pressing method in which pressing is carried out using a mechanically generated pressure, and a gas pressing method in which pressing is carried out using a gas pressure. The mechanical pressing method includes, for example, a method in which a motor is driven to apply pressure in the stacking direction via a ball screw, and a method in which a motor is driven to apply pressure in the stacking direction of the stack via hydraulic pressure. After pressing to a predetermined pressure, it is possible to suppress the energy consumption due to the driving of the motor to a minimum required level by fixing the operating unit with a mechanical stopper. The gas pressing method includes, for example, a method in which the stack is pressed vie a pressurized gas from a gas bomb. If the pressure is unintentionally increased to a level which is greater than the predetermined pressure and which is within the allowable range within which the battery will not be damaged, the pressure is decreased to the predetermined pressure. Hereinafter, in the combination of the stack and the outer covering, the part where the stack and the outer covering are contacted with each other and which will be pressed in the stacking direction is referred to as a stacked part.

When the solid-state battery and assembled battery of the present invention are not in use, the pressure applied to the stacked section is preferably in the range of 1 atm to 1 MPa. When the solid-state battery and assembled battery of the present invention are used as a power supply, the pressure applied to the stacked section is preferably in the range of 1 MPa to 45 MPa.

[Method for Producing the Solid-State Battery]

Next, a specific example of a method for producing a solid-state battery will be described with referring to the accompanying drawings.

The method for producing a solid-state battery of the present invention comprises (a) a step of forming a stack comprising at least one unit cell comprising a positive electrode layer comprising a positive electrode active material, a negative electrode layer comprising a negative electrode active material, and a solid electrolyte layer laminated between the positive and negative electrode layers; and (b) a step of forming a pressure receiving member.

The unit cell and stack of the solid-state battery can be produced using a common method. For example, a negative electrode layer can be formed by applying a negative electrode material paste containing in a solvent a negative electrode active material, and optionally further containing additives including a solid electrolyte, an electrically conductive material, a binder, etc., to one side of a current collector or a peelable substrate, and drying the paste. A positive electrode layer can be formed by applying a positive electrode material paste containing in a solvent a positive electrode active material and optionally further containing additives including a solid electrolyte, an electrically conductive material, a binder, etc., to one side of a current collector or a peelable substrate, and drying the paste. The solid electrolyte layer can be formed by applying a solid electrolyte paste to a surface of the negative or positive electrode layer formed as described above, and drying the paste, and in this case, a stack comprising a unit cell can be obtained by laminating a positive or negative electrode layer on the solid electrolyte layer formed on a surface of the negative or positive electrode layer and pressing them in the stacking direction to unify the negative electrode layer, solid electrolyte layer and positive electrode layer. The solid electrolyte layer can also be formed by applying a solid electrolyte paste to a surface of a peelable substrate and drying the paste, and in this case, a stack comprising a unit cell can be obtained by peeling off the solid electrolyte layer from the peelable substrate, and subsequently placing it between a negative electrode layer and a positive electrode layer, pressing the stack of the negative electrode layer, solid electrolyte layer and positive electrode layer in the stacking direction to unify the negative electrode layer, solid electrolyte layer and positive electrode layer. A person with ordinary skill in the art can select the method for stacking a negative electrode layer, a positive electrode layer, a current collector, and a solid electrolyte layer, depending on the desired structure for the stack comprising at least one unit cell. A stack having a structure as shown in FIG. 3(c) can be unified by, for example, applying a negative electrode material paste to both sides of a negative electrode current collector and drying the paste to form a negative electrode layer on both sides of the negative electrode current collector; applying a positive electrode material paste to both sides of a positive electrode current collector and drying the paste to form a positive electrode layer on both sides of the positive electrode current collector; placing a solid electrolyte layer between the resulting negative and positive electrode layers; and pressing them in the stacking direction to unify the negative electrode layer, solid electrolyte layer and positive electrode layer. The pressing pressure used in the unifying step in forming a stack comprising at least one unit cell is intended to increase the filling ratio of the electrode active materials in the negative and positive electrode layers, and to increase the filling ratio of the solid electrolyte in the solid electrolyte layer. The solvents for the negative electrode material paste, positive electrode material paste and solid electrolyte paste are not particularly limited, and hydrocarbon-based solvents such as saturated hydrocarbon-based solvents, aromatic hydrocarbon-based solvents, etc., may be used. The methods for applying the negative electrode material paste, positive electrode material paste and solid electrolyte paste are not particularly limited, and any methods known in the art including, for example, doctor blade method, die coating method, gravure coating method, etc., may be used. In addition to a method of forming a positive electrode layer, negative electrode layer and solid electrolyte layer respectively from a paste as described above, the positive electrode layer, negative electrode layer and solid electrolyte layer may also respectively be formed by pressure molding positive electrode material powder, negative electrode material powder and solid electrolyte powder with a powder molding method.

Stack 130 may be accommodated in outer covering 110 after providing outer covering 110 with pressure receiving member 120, or outer covering 110 may be provided with pressure receiving member 120 after accommodating stack 130 in outer coveting 110. If outer covering 110 has pressure receiving member 120 formed integrally with at least a part of outer covering 110, stack 130 may be accommodated in such an outer covering 110. If outer covering 110 is formed from two heat-sealable laminate films, a solid-state battery in the form as shown in FIGS. 1A and 1B and FIGS. 2A and 2B can be obtained by placing stack 130 between the two heat-sealable laminate films, joining the peripheries of the laminate films by a method such as heat-sealing, and providing two regions of opposite sides of the periphery with pressure receiving members. After accommodating stack 130 in a tubular or bag-shaped laminate film as an outer covering, both openings of the tubular laminate film or the opening of the bag-shaped laminate film may be heat-sealed, and then a pressure receiving member may be provided on at least a part of the periphery of the outer covering. After forming the pressure receiving member, the solid-state battery can be restrained while pressing the stack at a predetermined pressure in the stacking direction. Alternatively, an assembled battery can be obtained by stacking a plurality of the solid-state batteries having a pressure receiving member and restraining the plurality of the solid-state batteries while pressing them at a predetermined pressure in the stacking direction.

Figure 4A:
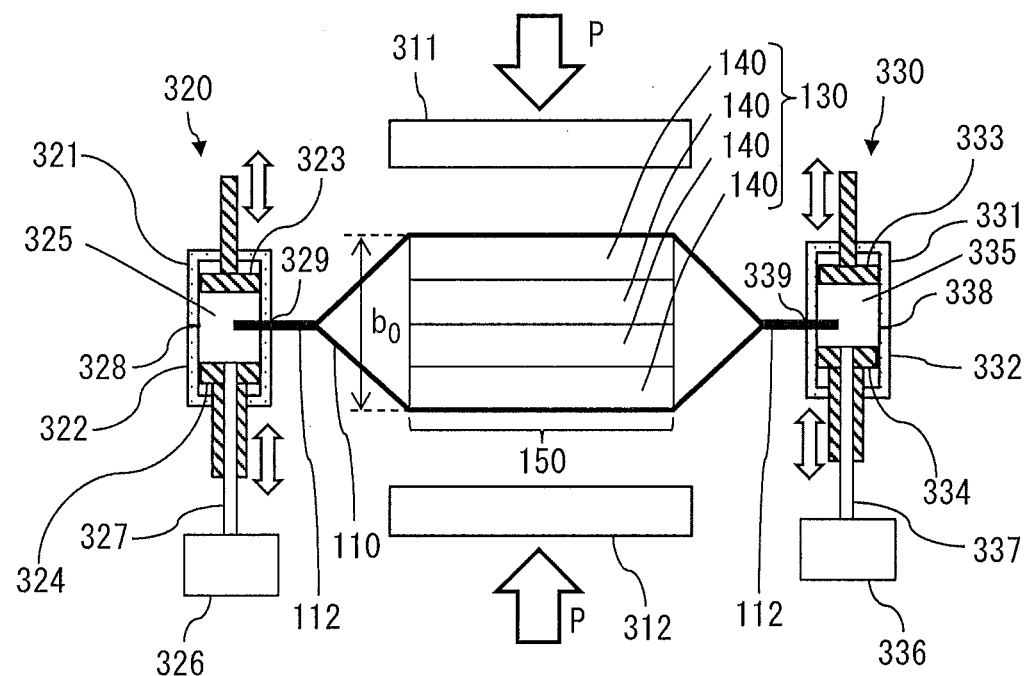
FIGS. 4A and 4B are respectively a schematic view illustrating an embodiment of a method for producing a solid-state battery of the present invention.
Figure 4B:
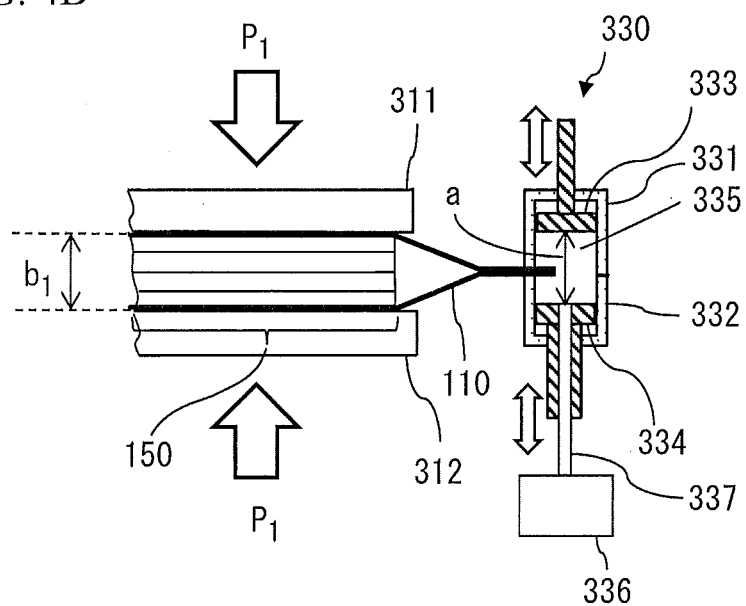

One embodiment of the method for producing a solid-state battery of the present invention is illustrated in FIGS. 4A and 4B. FIGS. 4A and 4B are schematic views illustrating a step of forming a pressure receiving member on at least a part of the periphery of outer covering 110 during pressing stack 130 and outer covering 110 at a predetermined pressure with a pair of pressing plates 311 and 312 in the stacking direction of stack 130 from the exterior of outer covering 110 after accommodating stack 130 in outer covering 110.

The predetermined pressure applied to the stacked section in forming the pressure receiving member may be (1) a pressure needed to simply hold the stacked section without substantially reducing the thickness of the stacked section, or may be (2) a pressure sufficient to improve the adhesion among the positive electrode layer comprising a positive electrode active material, the negative electrode layer comprising a negative electrode active material, and the solid electrolyte layer laminated between the positive and negative electrode layers in each unit cell by compressing the stacked section. When the predetermined pressure applied to the stacked section is (1) a pressure needed to simply hold the stacked section without substantially reducing the thickness of the stacked section, the thickness of the pressure receiving member to be formed can have a predetermined value set in advance depending on the thickness of the stacked section before pressing. For example, when a pressure is assumed to be applied to the stacked section during the production and/or operation of the solid-state battery after the formation of the pressure receiving member, the predetermined value of the thickness of the pressure receiving member can be determined so that the assumed pressure applied to the stacked section is not equal to or more than the level at which the stacked section will be damaged. The predetermined value of the thickness of the pressure receiving member to be formed can be determined by performing a preliminary experiment or simulation in which a stacked section having a predetermined thickness and configuration is formed and subsequently the stacked section is pressed. In addition, in mass-production of the solid-state battery, the predetermined value can be determined in consideration of the statistical variation in the thickness of the stacked section. When the predetermined pressure applied to the stacked section is (2) a pressure sufficient to improve the adhesion among the positive electrode layer comprising a positive electrode active material, the negative electrode layer comprising a negative electrode active material, and the solid electrolyte layer laminated between the positive and negative electrode layers in each unit cell by compressing the stacked section, the predetermined value of the thickness of the pressure receiving member to be formed can have a value corresponding to the thickness of the stacked section when the pressure applied to the stacked section is increased and reaches at a predetermined pressure (for example, a value equal to the thickness of the stacked section under a predetermined pressure). The predetermined pressure applied to the stacked section in forming a pressure receiving member has an allowable maximum value of less than the level at which the solid-state battery may be damaged due to the restraining pressure when the solid-state battery is in a restrained state at the time of use.

In FIGS. 4A and 4B, the stacked section is indicated by reference numeral 150. FIG. 4B is a schematic view illustrating a step of forming a pressure receiving member so that the pressure receiving member has a thickness equal to the thickness of stacked section 150 (i.e., the total value of the thickness of stack 130 and the thickness of outer covering 110) being pressed during pressing of stacked section 150 at a predetermined pressure. By pressing stack 130 of a plurality of the unit cells, the adhesion among the plurality of the unit cells can be improved. Moreover, the maximum output per volume of the solid-state battery is increased, and thereby a solid-state battery having a high output density can be obtained. In FIGS. 4A and 4B. a pair of pressing plates (i.e., the first and second pressing plates) of the pressing device (not shown) for pressing stacked section 150 are indicated by reference numerals 311 and 312, and the first and second molding devices for molding pressure receiving members are indicated with reference numerals 320 and 330. In FIGS. 4A and 4B, the present invention is described taking as an example an injection molding device as the first and second molding device. Other than the injection molding method, the pressure receiving member can be formed using a method such as casting, compression molding, transfer molding, etc., as long as a pressure receiving member having a thickness corresponding to the thickness of stacked section 150 after pressing. In the present invention, the device for forming a pressure receiving member is not limited to the illustrated device. The thickness of stacked section 150 (i.e., the total thickness of stack 130 and outer covering 110) before being pressed by the first pressing plate 311 and the second pressing plate 312 is represented with $b_0$ in FIG. 4A, and the total thickness of stack 130 and outer covering after pressing is represented with $b_1$ in FIG. 4B. Thickness $b_0$ of stacked section 150 as well as the variations in pressure and thickness of stacked section 150 during the pressing of stacked section 150 with the first and second pressing plates can be determined, for example, using a pressure sensor (not shown) capable of measuring the pressure exerted on the first and second pressing plates, and a distance sensor (not shown) capable of measuring the distance between the first and second pressing plates. The configurations and positions of such a pressure sensor and distance sensor are not particularly limited.

The first molding device 320 comprises upper mold frame 321, lower mold frame 322 upper pressing plate 323 and lower pressing plate 324, and further comprises cavity 325 defined by upper mold frame 321, lower mold frame 322, upper pressing plate 323 and lower pressing plate 324. Injection path 327 for injecting a liquid molding material from the first feeder 326 to cavity 325 passes through lower pressing plate 324. The second molding device 330 comprises upper mold frame 331, lower mold frame 332, upper pressing plate 333 and lower pressing plate 334, and further comprises cavity 335 defined by upper mold frame 331, lower mold 332, upper pressing plate 333, and lower pressing plate 334. In FIGS. 4A and 4B, each molding device is illustrated in a state that the upper and lower mold frames are clamped together. Injection path 337 for injecting a liquid molding material from the second feeder 336 to cavity 335 passes through lower pressing plate 334. The first and second molding devices may have an air vent hole (not shown) for discharging the air in the cavity to the outside, if necessary. Such an air vent hole may be provided, for example, in the upper pressing plate. In the first molding device 320 and the second molding device 330, the distance between the upper and lower pressing plates can be determined by, for example, a distance sensor (not shown). The configuration and position of such a distance sensor are not particularly limited.

In the first molding device 320 shown in FIG. 4A, upper mold frame 321 and lower mold frame 322 are in contact with each other at junction 328, and upper mold frame 321 and lower mold frame 322 form, in a state of being joined to each other as illustrated, inlet 329 for introducing at least a part of the periphery of the outer covering. After molding a pressure receiving member, the resulting pressure receiving member can be removed by mold opening, i.e., separating the upper and lower mold frames. Similarly, in the second molding device 330, upper mold frame 331 and lower mold frame 332 are in contact with each other at junction 338, and upper mold frame 331 and lower mold frame 332 form, in a state of being joined to each other as illustrated, inlet 339 for introducing at least a part of the periphery of the outer covering. After molding a pressure receiving member, the resulting pressure receiving member can be removed from the first and second molding devices by separating the upper and lower mold frames, and the stacked section can be removed from the pressing machine by releasing pressing plates 311 and 312. Although an injection path for injecting a molding material to the cavity is provided in the lower pressing plate in the embodiment illustrated in FIGS. 4A and 4B, the present invention is not limited to the embodiment illustrated in FIGS. 4A and 4B, and the injection path for injecting a molding material to the cavity may be provided, for example, in the upper pressing plate, upper mold frame and/or lower mold frame.

In each of the first and second molding devices shown in FIG. 4A, the upper and lower pressing plates are movable up and down, respectively, and the distance between the upper and lower pressing plates can be adjusted so that the distance between the upper and lower pressing plates become equal to the thickness of the pressure receiving member to be formed. If the molding material of the pressure receiving member is a material which has thermosetting properties and shrinks in volume due to thermosetting, or the molding material of the pressure receiving member is a material which has thermoplastic properties and shrinks in volume during solidification upon cooling, the thickness of the pressure receiving member after thermosetting or cooling can set the distance between the upper and lower pressing plates in consideration of the shrinkage factor. In the following description of the present invention, for simplicity and clarity, the volume shrinkage of the molding material by thermosetting or cooling is not considered.

Although FIG. 4A illustrates two molding devices of the first and second molding devices, the number and structure of the molding device is not limited to those illustrated and may be appropriately changed depending on the desired number, size and shape of the pressure receiving member. For example, in the case of forming a pressure receiving member on the periphery of the outer covering so as to surround stack 130, forming of the pressure receiving member can be carried out using a single molding device having an annular cavity to which a molding material is introduced. For example, when a thermosetting material is used as a molding material for the pressure receiving member, the molding device may comprise a temperature controller for heating the molding material to induce the thermosetting reaction of the thermosetting material after introducing the thermosetting material into the cavity. When the thermosetting material is solid (for example, in the form of powder, pellets, etc.), the thermosetting material is heated to a temperature which is less than the thermosetting temperature and at which the thermosetting material becomes fluid, and then is introduced into a cavity. When the thermosetting material is liquid, the thermosetting material can be introduced into a cavity without heating it. For example, when a thermoplastic material is used as a molding material for the pressure receiving member, at least one of the mold frames and upper and lower molds may comprise a temperature controller for cooling the molding material to solidify it after introducing the thermally plasticized thermoplastic material into a cavity. When a thermosetting material is used as a molding material for the pressure receiving member, the temperature controller may have not only a function of heating the molding material introduced into the cavity but also a function of heat-retaining and/or cooling, if needed. When a thermoplastic material is used as a molding material for the pressure receiving member, the temperature controller may have not only a function of cooling the molding material introduced into the cavity but also a function of heat-retaining and/or cooling, if needed.

In FIG. 4B and in FIGS. 6A, 6B and 6C as will be described later, one end of the stack and outer covering and a pair of pressing plates are illustrated for simplicity and clarity of the drawings. FIG. 4B further illustrates a set of feeder and molding device. In FIG. 4B, stacked section 150 is pressed by a pair of pressing plates 311 and 312, and the thickness of the stacked section when the pressure is achieved at a predetermined pressure $P_1$ is represented with $b_1$. Predetermined pressure $P_1$ may be a pressure less than the pressure at which there is a possibility of occurrence of a malfunction such as destruction, excessive output, etc., of battery, if the stack or solid-state batteries is or are pressed excessively due to the failure of the control system of the production apparatus or pressure control device during use of the solid-state battery or during the production of an assembled battery by stacking a plurality of the solid-state batteries according to the present invention. Then, a pressure receiving member having a thickness of $b_1$ can be formed by adjusting the positions of upper pressing plate 333 and lower pressing plate 334 of the molding device so that distance a between upper pressing plate 333 and lower pressing plate 334 is equal to thickness $b_1$, and subsequently introducing a molding material into cavity 335 through injection path 337 from feeder 336 and curing the molding material. By forming a pressure receiving member having a thickness of) $b_1$, it is possible to press the stacked section until the thickness is decreased from $b_0$ to $b_1$, and therefore the battery (having thickness of $b_2$) having a pressure receiving member having thickness $b_1$ after removing pressure has a compression margin $b_2-b_1$ in the stacking direction of the stacked section even if the thickness of the stacked section is increased to $b_2$ ($b_1<b_2\leq b_0$) after removing pressure of the battery.

Figure 5A:
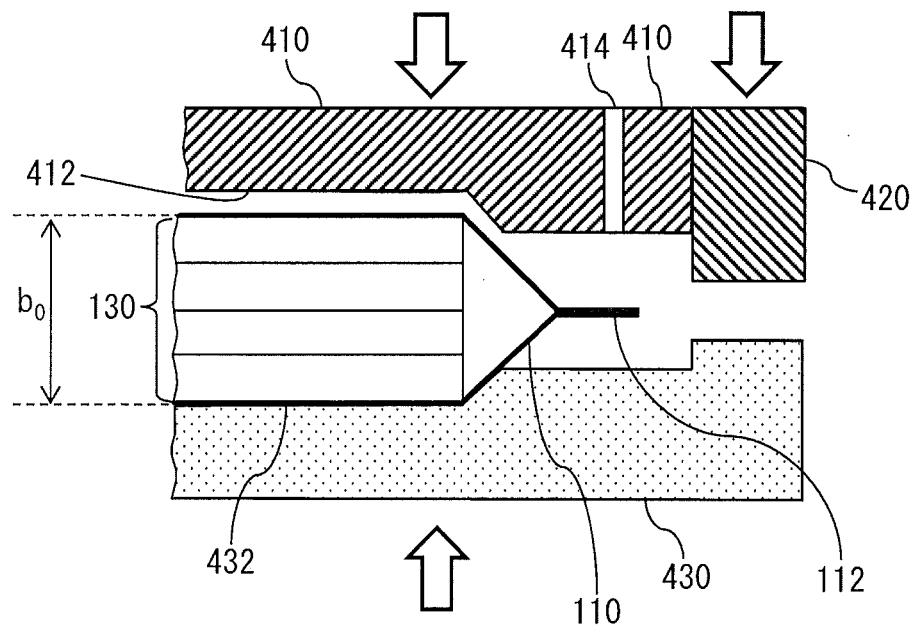
FIGS. 5A and 5B are schematic view illustrating another embodiment of a method for producing a solid-state battery of the present invention.
Figure 5B:
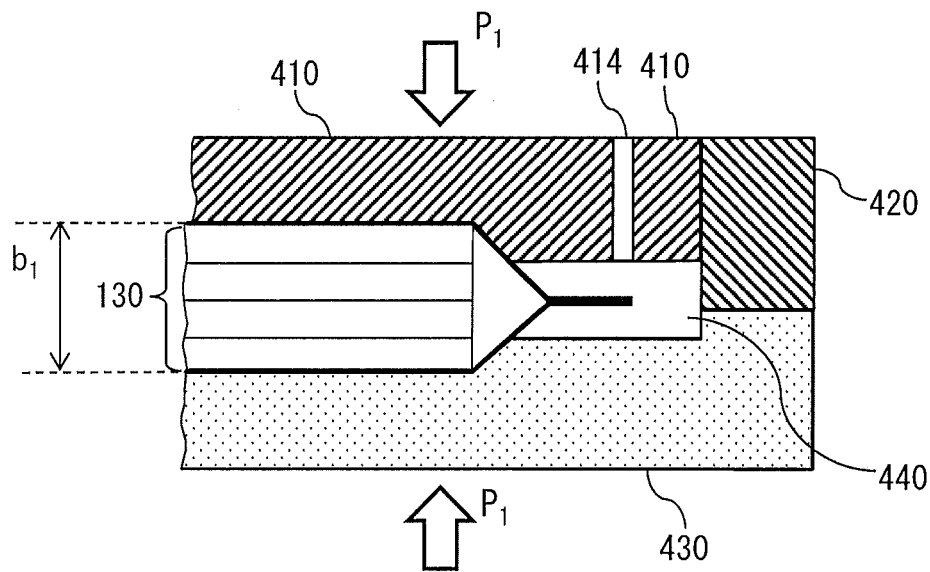

Another embodiment of the method for producing a solid-state battery of the present invention is illustrated by FIGS. 5A and 5B. According to the production method of the embodiment shown in FIGS. 5A and 5B, a solid-state battery of the embodiment shown in FIGS. 2A and 2B can be produced. In the embodiment shown in FIGS. 5A and 5B, after accommodating stack 130 in outer covering 110, a pressure receiving member can be formed at least a part of the periphery of outer covering 110 while pressing stack 130 accommodated in outer covering 110 within a cavity formed by the first upper mold 410, the second upper mold 420 and lower mold 430 at a predetermined pressure by the first upper mold 410 and lower mold 430. The first upper mold 410 has a recessed section 412 and openable and closable injection path 414 for injecting a liquid molding material into cavity 240 after mold clamping, and lower mold 430 has recessed section 432. Recessed section 412 of the first upper mold 410 and recessed section 432 of lower mold 430 are provided at position to face each other, and therefore it is possible to press stack 130 accommodated in outer covering 110 while fitting the stack between recessed section 412 of the first upper mold 410 and recessed section 432 of lower mold 430. The first upper mold 410, the second upper mold 420 and lower mold 430 are movable relatively to each other by a mold clamping device (not shown), and are configured to be clampable and openable. Injection path 414 is provided at a position where a molding material can be fed around sealed region 112 of the periphery of outer covering 110. In FIG. 5A, stack 130 accommodated in outer covering 110 can be fitted in recessed section 432 of lower mold 430, and therefore it is possible to prevent the misalignment of the stack. The molding material is injected in cavity 440 after mold clamping with a mold clamping pressure by the mold clamping device. After forming the pressure receiving member by curing the molding material injected into cavity 440, the mold is opened and the solid-state battery having a pressure receiving member is removed.

Since it is possible to form a pressure receiving member to have a thickness equal to the thickness of stacked section 150 when the pressure applied to stacked section 150 reaches to a predetermined pressure as described above, the pressure applied to the stacked section in the stacking direction can be increased to an allowable maximum pressure without excessively pressing the stacked section even if the stacked section before pressing is thinner or thicker than the preset thickness, and thereby it is possible to form a pressure receiving member having a thickness equal to the thickness of the stacked section under the condition that the allowable maximum pressure is applied to the stacked section. Therefore, even if there are variations from a designed value in the thickness of the stacked section, it is possible to obtain a solid-state battery capable of being pressed up to the allowable maximum pressure without excessively pressing the stacked section. In addition, since the pressure receiving member can be formed depending on the thickness during the pressing of each stacked section, it is possible to improve the dimensional accuracy of the pressure receiving member to each stacked section.

The method for producing the solid-state battery of the present invention may further comprises between steps (a) and (b), a step of charging the solid-state battery to a predetermined minimum charge state for the solid-state battery, and step (b) can be carried out while maintaining the solid-state battery in the predetermined minimum charge state. The predetermined minimum charge state can be a state of charge (SOC 0%) used in the production of the solid-state battery or a minimum charge state (for example, SOC 20%) when the solid-state battery is used as a power supply (for example, a power supply during vehicle driving). In this case, "State of Charge (SOC)" is an index indicating the charging state of a battery, and is expressed as a percentage (%) of the charged amount to the battery capacity in the range of reversibly chargeable and dischargeable operation voltage. SOC 0% means the empty charge state, and SOC 100% means the fully charged state. The thickness of the stacked section after charging the solid-state battery to a minimum charge state when the solid-state battery is used as a power supply, for example, to SOC 20%, is generally thicker than the thickness of the stacked section after charging to SOC 0, and therefore a solid-state battery in which a pressure receiving member having a thickness equal to the thickness of the stacked section after charging to SOC 0% has been formed, may be pressed up to a pressure greater than an allowable maximum pressure if an excessive pressure is applied to the stacked section when the solid-state battery has been charged to SOC 20%. Therefore, step (b) is preferably carried out while maintaining a solid-state battery at a minimum charge state when the solid-state battery is used as a power supply, for example maintaining a solid-state battery at SOC 20%. After charging the solid-state battery to a state of charge simulating the minimum charge state at the time of use, the stacked section can be pressed in the stacking direction to an allowable maximum pressure, and thereby it is possible to form a pressure receiving member having a thickness equal to the thickness of the stacked section under the condition that the allowable maximum pressure is applied to the stacked section.

[Methods for Producing and Using Assembled Battery]

By using as a component of an assembled battery a solid-state battery comprising a pressure receiving member as described above, it is possible to prevent the stacked solid-state batteries of the assembled battery from being excessively pressed in the stacking direction during the production or use of the assembled battery. Furthermore, it is possible to improve the adhesion between the solid-state batteries of an assembled battery, and thereby it is possible to obtain an assembled battery having a high output density. An assembled battery in which a plurality of the solid-state batteries are stacked will be described with referring to FIGS. 6A and 6B. FIGS. 6A and 6B are schematic views illustrating (1) a step of pressing a plurality of the solid-state batteries in the method for producing an assembled battery from a plurality of the solid-state batteries, and (2) a step of pressing the plurality of the solid-state batteries of the assembled battery during the operation of the resulting assembled battery. FIG. 6A shows a plurality of solid-state batteries 100 each having a stacked section with a thickness of $b_3$ and pressure receiving member 120 with a thickness of $b_1$, in a manner that they are stacked each other at their stacked sections. An assembled battery can be obtained by stacking a plurality of the solid-state batteries each having a pressure receiving member formed thereon, and restraining the plurality of the solid-state batteries while pressing them at a predetermined pressure in the stacking direction. The pressure used in retraining the plurality of the solid-state batteries is selected depending on the number of the solid-state batteries, etc.

Figure 6A:
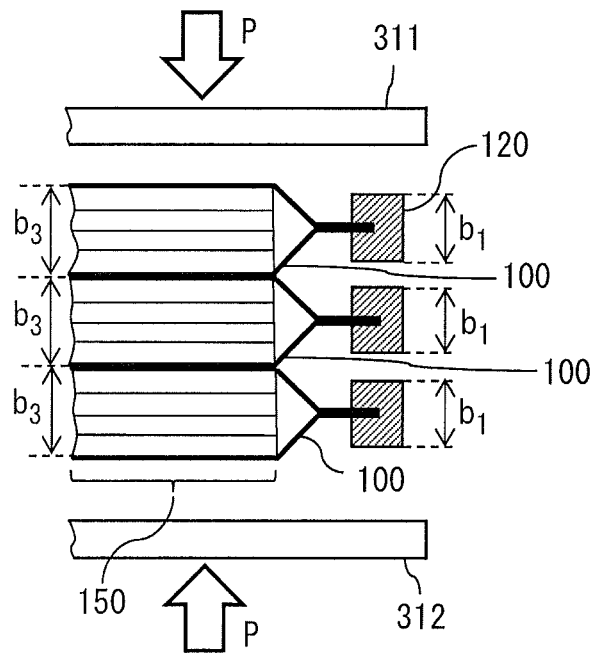
FIG. 6A is a schematic view illustrating the step of pressing a plurality of the solid-state batteries in the method for producing an assembled battery from a plurality of the solid-state batteries.

In the embodiment shown in FIG. 6A, pressure receiving members 120 of the plurality of solid-state batteries 100 are arranged in series and spaced apart from each other along the stacking direction. The plurality of solid-state batteries 100 may be those having an increased thickness of $b_2$ ($b_1 < b_2 \leq b_0$) after pressing stacked section 150 to have a thickness of $b_1$ as described for FIG. 4B, when forming a pressure receiving member, or may be those in which the stacked section is not pressed during a time period from after the preparation of stacked section 150 until the plurality of the solid-state batteries are stacked with each other. Therefore, thickness $b_3$ of each solid-state battery before pressing as shown in FIG. 6A, can be equal to $b_0$ or $b_2$ ($b_1 < b_2 \leq b_0$). The plurality of solid-state batteries 100 may respectively be charged to a minimum charge state when the assembled battery obtained after pressing is used as a power supply.

Figure 6B:
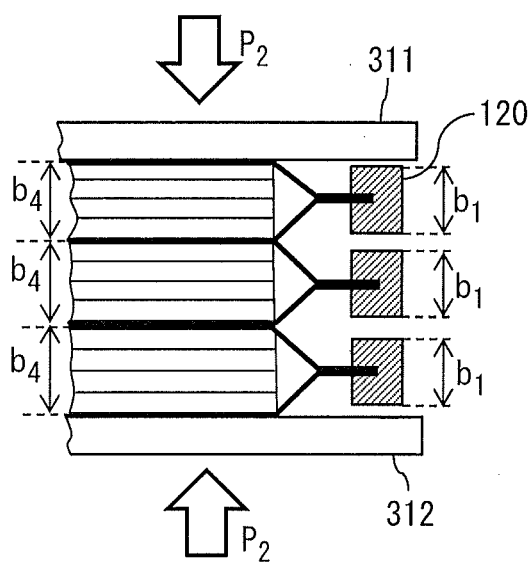
FIGS. 6B and 6C are respectively a schematic view illustrating a step of pressing the plurality of the solid-state batteries of the assembled battery when operating the resulting assembled battery.
Figure 6C:
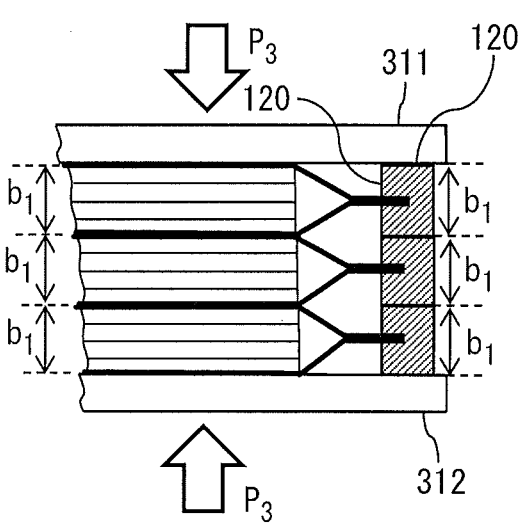

FIG. 6B illustrates a state that the thickness of each solid-state battery is decreased to $b_4$ ($b_1 < b_4 < b_3$) by pressing the stack of a plurality of solid-state batteries 100 shown in FIG. 6A in the stacking direction to predetermined pressure $P_2$. FIG. 6B illustrates that, if the thickness of stacked section in each solid-state battery is decreased to $b_1$ by further increasing the pressure to $P_3$, pressure receiving members 120 each having a thickness of $b_1$ arranged in series and spaced apart from each other along the stacking direction, are brought into contact with each other between pressing plates 311 and 312, as shown in FIG. 6C. Therefore, if the contact between pressure receiving members 120 of the plurality of the solid-state batteries between pressing plates 311 and 312 can be detected, it is possible to prevent the damage of the pressure receiving member due to excessive pressing of the stack of the plurality of the solid-state batteries and the damage of the stacked section which may be caused by the application of an excessive pressure to the stacked section due to the damage of the pressure receiving member. The judgment as to whether pressure receiving members 120 of the plurality of solid-state batteries 100 are in contact with each other between pressing plates 311 and 312 or not can be carried out by, for example, if the pressure receiving members are formed of an electrically conductive material, monitoring whether or not there is an electrical conduction between pressing plates 311 and 312 through a plurality of pressure receiving members 120 from the topmost pressure receiving member to the lowest pressure receiving member, and judging that pressure receiving members 120 are in contact with each other when electrical conduction current was detected, or judging that pressure receiving members 120 are not in contact with each other when electrical conduction was not detected. The state in which pressure receiving members 120 of the plurality of solid-state batteries 100 are in contact with each other (or electrically conductive state) between pressing plates 311 and 312 can be set as an abnormal state, and also a state in which pressure receiving members 120 of the plurality of solid-state batteries 100 are not contact with each other (or electrically non-conductive state) between pressing plates 311 and 312 can be set. The electrical conduction can be monitored by providing pressing plates 311 and 312 with an electrical conduction detection sensor (not shown) as an electrical conduction detection means for monitoring whether or not there is electrical conduction between pressing plates 311 and 312 through the plurality of pressure receiving members. Since it is desirable to reduce errors as much as possible, it is preferable to judge that pressure receiving members 120 are in contact with each other between pressing plates 311 and 312 when electrical conduction is detected for a predetermined time period. This predetermined time period can be preliminary determined in such a range that the pressure receiving members and stacked section will not be damaged by pressing. If electrical conduction is not detected (i.e., when the production step of the assembled battery is judged as being normal), then the plurality of the solid-state batteries obtained after pressing can be restrained by, for example, an appropriate restraining device. If electrical conduction is detected for a predetermined time period, it is possible to carry out a predetermined step, for example, a step selected from a step of stopping the pressing of the stack of the plurality of the solid-state batteries and a step of decreasing the applied pressure to a level at which electrical conduction is not detected.

FIG. 7 shown a flowchart illustrating the steps involved in one embodiment of a method for producing the assembled battery described above. First, as shown in FIG. 6A, a plurality of solid-state batteries 100 are stacked so that pressure receiving members 120 of the plurality of solid-state batteries 100 are arranged in series and spaced apart from each other along the stacking direction of the solid-state batteries (step S101). Next, monitoring on the electrical conduction between the pressing plates through the pressure receiving members of the plurality of the solid-state batteries is carried out until a predetermined pressure is achieved while pressing the stack of the solid-state batteries obtained in step S101 in the stacking direction to the predetermined pressure by a pressing device (step S102). If electrical conduction is detected between the pressing plates for a predetermined time period until the predetermined pressure is achieved, it is judged as abnormal; however, if electrical conduction is not detected, the pressing is judged as having been carried out normally (step S103). If electrical conduction is not detected in step S103, the pressed stack of the plurality of the solid-state batteries can be restrained by, for example, an appropriate restraining device to provide an assembled battery (S104). If electrical conduction is detected in step S103, the pressing devise is stopped in emergency, or the pressing pressure is decreased forcibly to a level at which electrical conduction is not detected (step S105). After stopping the pressing of the stack of the plurality of the solid-state batteries or decreasing the pressing pressure to a level at which electrical conduction is not detected in step S105, the production of an assembled battery can be restarted by removing the stack of the plurality of the solid-state batteries from between the pressing plates and newly stacking a plurality of the solid-state batteries between the pressing plates. If electrical conduction is detected in step S103, it is possible to determine as to whether the plurality of the solid-state batteries removed from between the pressing plates can be reused or not by individually examining if each solid-state battery is damaged or not.

Figure 8:
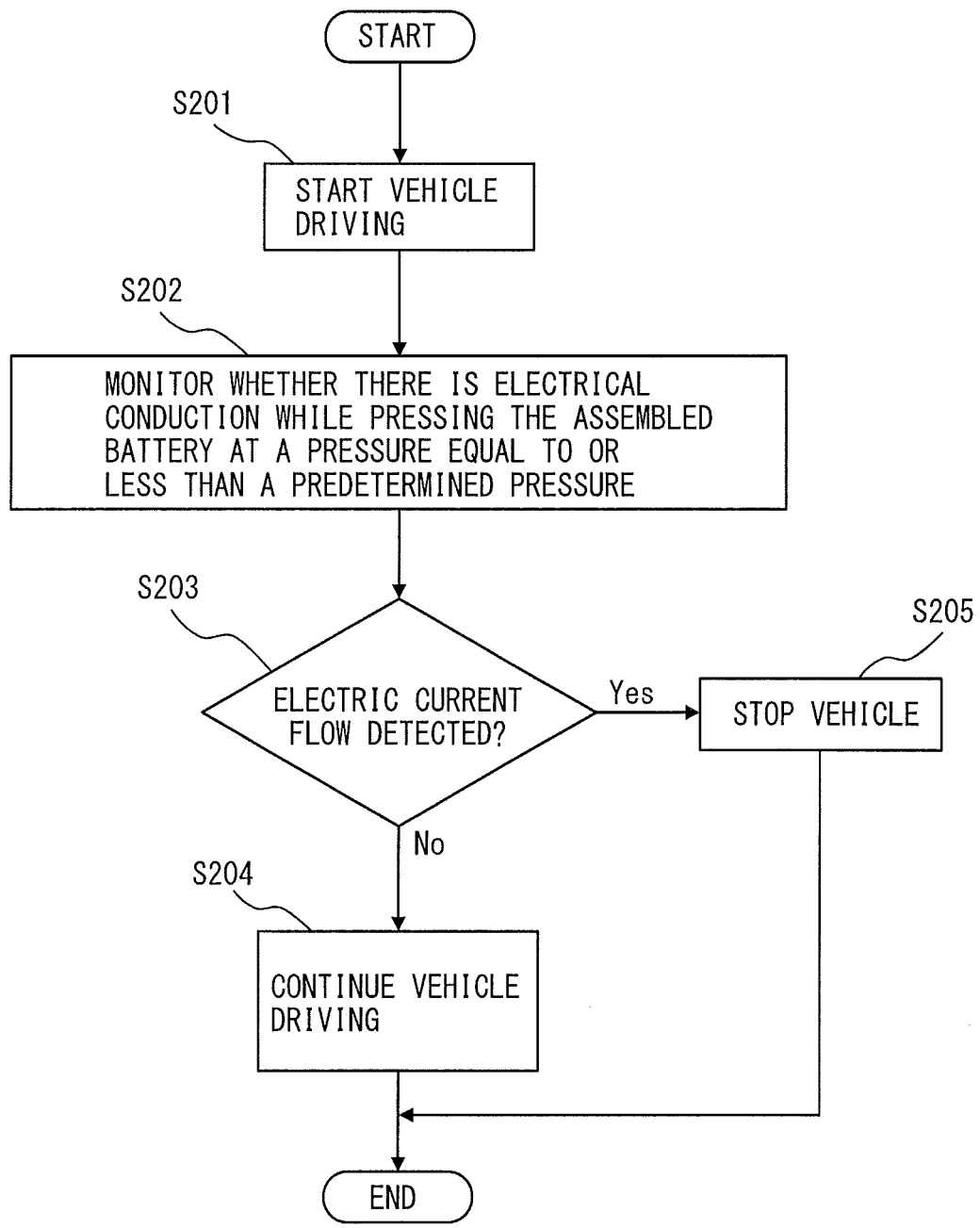
FIG. 8 shows a flowchart of the driving control for the vehicle mounting an assembled battery according to the present invention as a power supply, along with a pressing device for pressing the assembled battery.

FIG. 8 shows a flowchart of drive control for a vehicle mounted with a power storage device comprising an assembled battery according to the above embodiment of the present invention, a pressing device for pressing the assembled battery in the stacking direction of the plurality of the solid-state batteries of the assembled battery, and an electrical conduction detecting device for detecting that a plurality of the pressure receiving members of the plurality of the solid-state batteries are in contact with each other in response to the compression of the plurality of the solid-state batteries of the assembled battery in the stacking direction due to pressing of the solid-state batteries in the stacking direction, by electrical conduction through the plurality of the pressure receiving members in the stacking direction. The direction of pressing the assembled battery of the present invention is the stacking direction of the plurality of the solid-state battery of the assembled battery. The pressing direction of the assembled battery according to the present invention is the stacking direction of the plurality of the solid-state batteries of the assembled battery. In the vehicle mounted with the assembled battery according to the present invention and a pressing device for pressing it, the discharge current of the assembled battery can be controlled by adjusting the pressure applied to the assembled battery depending on the driving state of the vehicle and the state of charge of the assembled battery. The upper limit of the pressure applied to the assembled battery can be set to a value at which the assembled battery may not be damaged. By setting this upper limit as a predetermined pressure, the assembled battery can be pressed at a pressure equal to or less than this upper limit. Moreover, in such a vehicle, it is possible to prevent the pressure applied to the assembled battery from being increased to an excessively high pressure greater than the level at which the assembled battery may be damaged due to, for example, the failure of the controlling system, by monitoring whether or not there is electrical conduction between the pressing plates through the plurality of the solid-state batteries, as described for the embodiment of FIG. 7. In FIG. 8, step S201 is a step of starting the driving of the vehicle. Step S202 is a step of monitoring whether or not there is electrical conduction between the pressing plates through the plurality of the solid-state batteries, as a result of an increase in pressure up to an excessively high level at which the assembled battery may be damaged due to, for example, the failure of the controlling system. If electrical conduction is detected between the pressing plates for a predetermined time period until the predetermined pressure is achieved, it is judged as abnormal; however, if electrical conduction is not detected, the pressing is judged as having been carried out normally (step S203). If electrical conduction is not detected for a predetermined time period in step S203, then the driving of the vehicle is continued (S204). If electrical conduction is detected in step S203, the pressing pressure is decreased forcibly to a level at which electrical conduction is not detected to stop the vehicle (step S205). If electrical conduction is detected in step S203, the control system is repaired, and in addition, it is possible to determine as to whether the assembled battery can be reused or not by examining if the assembled battery is damaged or not.

Although embodiments of the present invention have been described with referring to the drawings, these embodiments are for illustration, and the present invention is not limited to the embodiments shown in the drawings.

INDUSTRIAL APPLICABILITY

The solid-state battery and assembled battery of the present invention have excellent performance characteristics such as reliability, durability, etc., in addition to improved capacity and output density, and are useful as a power supply for a motor, mounted in vehicles such as a hybrid vehicle, electric vehicle, etc.

REFERENCE SIGNS LIST

100 Solid-state battery
110 Outer package
112 Sealed region of the periphery of the outer package
120, 121 Pressure receiving member
130,130A, 130B Stack
140 Unit cell 141 Positive electrode layer
142 Negative electrode layer
143 Solid electrolyte layer
144, 144a to d Current collector
150 Stacked section
410 First upper mold
420 Second upper mold
430 Lower mold
311, 312 Pressing plate
320, 330 Molding device
321, 331 Upper mold frame
322, 332 Lower mold frame
323, 333 Upper pressing plate
324, 334 Lower pressing plate
325, 335 Cavity
326, 336 Feeder
327, 337 Injection path
328, 338 Junction
329, 339 Inlet

The invention claimed is:

1. A solid-state battery comprising:
a stack comprising at least one unit cell comprising a positive electrode layer comprising a positive electrode active material, a negative electrode layer comprising a negative electrode active material, and a solid electrolyte layer laminated between the positive and negative electrode layers; and
an outer covering accommodating the stack,
wherein the solid-state battery further comprising a pressure receiving member provided on at least a part of a periphery of the outer covering, and wherein the pressure receiving member has a thickness of less than a total thickness of the stack and the outer covering in a stacking direction of the unit cell, and
wherein the pressure receiving member is not electrically connected to the positive electrode layer or the negative electrode layer.

2. The solid-state battery according to claim 1, wherein the pressure receiving member has electrical conductive properties.

3. A method for producing the solid-state battery according to claim 1, comprising steps of:
(a) forming a stack comprising at least one unit cell comprising a positive electrode layer comprising a positive electrode active material, a negative electrode layer comprising a negative electrode active material, and a solid electrolyte layer laminated between the positive and negative electrode layers;
(b) accommodating the stack in an outer covering; and
(c) forming a pressure receiving member on at least a part of the periphery of the outer covering, wherein the pressure receiving member has a thickness of less than the total thickness of the stack and the outer covering in the stacking direction of the unit cell.

4. The method according to claim 3, wherein, in step (c), the pressure receiving member is formed by molding to have a thickness corresponding to the thickness of the stack when the stack is pressed at a predetermined pressure in the stacking direction of the unit cell,
wherein the predetermined pressure is (1) a pressure needed to hold the stacked section without substantially reducing the thickness of the stacked section which is a part where the stack and the outer covering are contacted with each other and which will be pressed in the stacking direction, or (2) a pressure sufficient to improve the adhesion among the positive electrode layer, the negative electrode layer, and the solid electrolyte layer in each unit.

5. The method according to claim 4, wherein the predetermined pressure is an allowable maximum pressure that avoids damage to the stacked section during use of the solid-state battery.

6. The method according to claim 4, further comprising a step of charging the solid-state battery to a predetermined minimum charge state of the solid-state battery between steps (a) and (b), wherein step (b) is carried out while maintaining the solid-state battery at a predetermined minimum charge state.

7. An assembled battery comprising a plurality of the solid-state batteries according to claim 1, wherein the solid-state batteries are stacked in the same direction as the stacking direction of the stack.

8. A method for producing an assembled battery comprising a plurality of solid-state batteries, comprising steps of:
(i) providing a plurality of the solid-state batteries comprising:
a stack comprising at least one unit cell comprising a positive electrode layer comprising a positive electrode active material, a negative electrode layer comprising a negative electrode active material, and a solid electrolyte layer laminated between the positive and negative electrode layers; and
an outer covering accommodating the stack,
wherein the solid-state battery further comprising a pressure receiving member provided on at least a part of a periphery of the outer covering, and wherein the pressure receiving member has a thickness of less than a total thickness of the stack and the outer covering in the stacking direction of the unit cell;
(ii) stacking the plurality of the solid-state batteries so that the pressure receiving members of the plurality of the solid-state batteries are arranged in series and spaced apart from each other along the stacking direction, wherein the stacking direction of the positive electrode layer, the solid electrolyte layer and the negative electrode layer of each of the plurality of the solid-state batteries is the same as the stacking direction of the plurality of the solid-state batteries; and
(iii) pressing the plurality of the solid-state batteries in the stacking direction,
wherein none of the pressure receiving members are electrically connected to the positive electrode layer or the negative electrode layer.

9. The method for producing an assembled battery according to claim 8, wherein the pressure receiving members of the plurality of the solid-state batteries each have electrical conductive properties, and in step (iii), further comprising detecting that a plurality of the pressure receiving members of the plurality of the solid-state batteries are in contact with each other in response to the compression of the plurality of the solid-state batteries in the stacking direction due to pressing of the solid-state batteries in the stacking direction by electrical conduction through the plurality of the pressure receiving members in the stacking direction, and if electrical conduction through the plurality of the pressure receiving members is detected, further comprising stopping the pressing of the plurality of the solid-state batteries or decreasing a pressing pressure to a level at which electrical conduction is not detected.

10. A power storage device comprising:
an assembled battery according to claim 7,
a pressing device for pressing the assembled battery in the stacking direction of the plurality of solid-state batteries of the assembled battery, and
an electrical conduction detecting device for detecting contact between the plurality of the pressure receiving members of the plurality of the solid-state batteries in response to the compression of the plurality of the solid-state batteries of the assembled battery in the stacking direction due to the pressing of the plurality of the solid-state batteries by electrical conduction through the plurality of the pressure receiving members in the stacking direction.

11. A vehicle comprising the power storage device according to claim 10.

12. The method according to claim 5, further comprising a step of charging the solid-state battery to a predetermined minimum charge state of the solid-state battery between steps (a) and (b), wherein step (b) is carried out while maintaining the solid-state battery at a predetermined minimum charge state.

13. An assembled battery comprising a plurality of the solid-state batteries according to claim 2, wherein the solid-state batteries are stacked in the same direction as the stacking direction of the stack.

14. A power storage device comprising:
an assembled battery according to claim 13,
a pressing device for pressing the assembled battery in the stacking direction of the plurality of solid-state batteries of the assembled battery, and
an electrical conduction detecting device for detecting contact between the plurality of the pressure receiving members of the plurality of the solid-state batteries in response to the compression of the plurality of the solid-state batteries of the assembled battery in the stacking direction due to the pressing of the plurality of the solid-state batteries by electrical conduction through the plurality of the pressure receiving members in the stacking direction.

15. A power storage device comprising:
an assembled battery according to claim 8,
a pressing device for pressing the assembled battery in the stacking direction of the plurality of solid-state batteries of the assembled battery, and
an electrical conduction detecting device for detecting contact between the plurality of the pressure receiving members of the plurality of the solid-state batteries in response to the compression of the plurality of the solid-state batteries of the assembled battery in the stacking direction due to the pressing of the plurality of the solid-state batteries by electrical conduction through the plurality of the pressure receiving members in the stacking direction.

16. A vehicle comprising the power storage device according to claim 14.

17. A vehicle comprising the power storage device according to claim 15.

18. The solid-state battery according to claim 1, wherein the battery comprises a positive electrode terminal and a negative electrode terminal, and a positive electrode current collector and a negative electrode current collector, and wherein the positive electrode current collector and negative electrode current collector are respectively connected through a current collecting lead to the positive electrode terminal and the negative electrode terminal.

19. The solid-state battery according to claim 1, wherein the pressure receiving member is made from a thermosetting resin or a thermoplastic resin.

* * * * *